US009460523B1

United States Patent
Fujio et al.

(10) Patent No.: US 9,460,523 B1
(45) Date of Patent: Oct. 4, 2016

(54) IMAGE PROCESSING DEVICE, IMAGE PROCESSING METHOD, AND NON-TRANSITORY COMPUTER-READABLE MEDIUM

(71) Applicant: FUJI XEROX CO., LTD., Tokyo (JP)

(72) Inventors: Makoto Fujio, Yokohama (JP); Toshihiro Iwafuchi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/876,119

(22) Filed: Oct. 6, 2015

(30) Foreign Application Priority Data

Apr. 13, 2015 (JP) ................. 2015-081737

(51) Int. Cl.
*G06K 9/00* (2006.01)
*G06T 7/40* (2006.01)
*G06T 11/00* (2006.01)

(52) U.S. Cl.
CPC ............ *G06T 7/408* (2013.01); *G06T 11/001* (2013.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 7,663,640 B2* | 2/2010 | Nayar | ................. | G06T 3/00 345/589 |
| 9,330,616 B2* | 5/2016 | Horikawa | ............ | G09G 3/3607 |
| 2004/0061700 A1* | 4/2004 | Shioya | ................. | G06T 15/506 345/426 |
| 2006/0170994 A1* | 8/2006 | MacKinnon | ............. | H04N 1/60 358/518 |
| 2009/0122371 A1* | 5/2009 | Iwafuchi | ............. | H04N 1/6058 358/518 |
| 2009/0153580 A1* | 6/2009 | Hasegawa | ............ | H04N 1/6058 345/590 |
| 2010/0254692 A1* | 10/2010 | Kurt | ..................... | H04N 5/2354 396/155 |
| 2013/0257895 A1* | 10/2013 | Iwafuchi | .................. | H04N 9/73 345/593 |
| 2013/0308144 A1* | 11/2013 | Iwafuchi | ................ | B41J 2/2128 358/1.9 |
| 2015/0179093 A1* | 6/2015 | Yamazaki | ............ | G09G 3/2003 345/600 |
| 2015/0235628 A1* | 8/2015 | Sakai | .................... | G06F 3/1423 345/593 |
| 2015/0356751 A1* | 12/2015 | Iwafuchi | .................. | G09G 5/02 345/591 |

FOREIGN PATENT DOCUMENTS

JP         2011-004091 A      1/2011

* cited by examiner

*Primary Examiner* — Andrae S Allison
(74) *Attorney, Agent, or Firm* — Oliff PLC

(57) ABSTRACT

In an image processing device, first to third color values are acquired. The first color value is a color value of a specific pixel in a first image obtained by photographing a subject illuminated by a photographic light source. The second color value is a color value of a pixel corresponding to the specific pixel in a second image obtained by photographing the subject not illuminated by the photographic light source. The third color value expresses a luminance closer to that of the first color value than the second color value, and a chroma closer to that of the second color value than the first color value. For a third image generated from the first and second images, a setting unit sets the color value of a pixel corresponding to the specific pixel in the third image to the third color value.

11 Claims, 12 Drawing Sheets

… (US 9,460,523 B1)

IMAGE PROCESSING DEVICE, IMAGE PROCESSING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2015-081737 filed Apr. 13, 2015.

BACKGROUND

Technical Field

The present invention relates to an image processing device, an image processing method, and a non-transitory computer-readable medium.

SUMMARY

According to an aspect of the invention, there is provided an image processing device including: a first color value acquirer that acquires a first color value, which is a color value of a specific pixel in a first image obtained by photographing a subject illuminated by a photographic light source, which is a light source used for photography; a second color value acquirer that acquires a second color value, which is a color value of a pixel corresponding to the specific pixel in a second image obtained by photographing the subject not illuminated by the photographic light source; a third color value acquirer that acquires a third color value expressing a luminance closer to the luminance of the first color value than the luminance of the second color value, and a chroma closer to the chroma of the second color value than the chroma of the first color value; and a setting unit that, for a third image generated on a basis of the first image and the second image, sets the color value of a pixel corresponding to the specific pixel in the third image to the third color value.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail and with reference to the attached drawings.

[Color Processing System]

Figure 1:
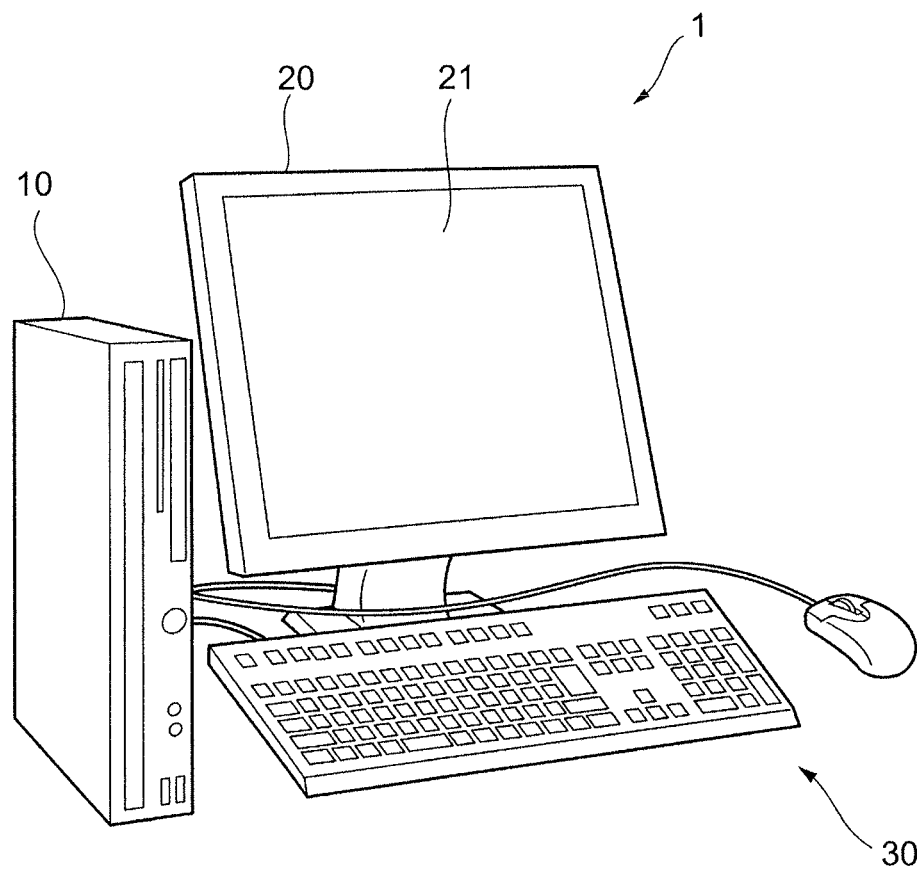
FIG. 1 is a diagram illustrating an exemplary configuration of a color processing system according to an exemplary embodiment of the present invention.

FIG. 1 is a diagram illustrating an exemplary configuration of a color processing system 1 according to an exemplary embodiment. As illustrated in FIG. 1, the color processing system 1 according to an exemplary embodiment is equipped with a color processing device 10 that conducts color processing using information such as image information input from a camera, a display device 20 that displays images on the basis of information input from the color processing device 10, and an input device 30 by which the user input various information into the color processing device 10.

The color processing device 10 is a so-called general-purpose personal computer (PC), for example. Additionally, the color processing device 10 is configured to conduct color processing by causing various application software to operate under management by an operating system (OS). Also, although not illustrated, a camera is connectable to the color processing device 10.

The display device 20 displays images on a display screen 21. The display device 20 is made up of a device equipped with a function of displaying images by additive color mixing, such as a liquid crystal display for a PC, a liquid crystal TV, or a projector, for example. Consequently, the display method by the display device 20 is not limited to a liquid crystal method. Note that the display screen 21 is provided inside the display device 20 in the example illustrated in FIG. 1, but in the case of using a projector as the display device 20, for example, the display screen 21 becomes a screen or the like provided externally to the display device 20.

The input device 30 is made up of a keyboard, a mouse, and the like. The input device 30 is used to launch and close application software for color processing, or as discussed in detail later, to input an instruction into the color processing device 10 when conducting color processing.

Herein, the color processing device 10 and the display device 20 are connected via Digital Visual Interface (DVI), for example, but may also be connected via an interface such as High-Definition Multimedia Interface (HDMI; registered trademark) or DisplayPort instead of DVI.

In addition, the color processing device 10 and the input device 30 are connected via Universal Serial Bus (USB), for example, but may also be connected via an interface such as IEEE 1394 or RS-232C.

Note that the color processing system 1 according to an exemplary embodiment is not limited to the configuration of FIG. 1. For example, a tablet may also be used as the color processing system 1. In this case, the tablet is equipped with a touch panel, and the touch panel is used to display images and also to sense user instructions. In other words, the touch panel functions as the display device 20 and the input device 30. Otherwise, a touch monitor may also be used as a device combining the display device 20 and the input device 30. A touch monitor uses a touch panel as the display screen 21 of the display device 20. In this case, information is created by the color processing device 10, and images are displayed on the touch monitor on the basis of the information. Subsequently, the user touches the touch monitor or the like, and thereby inputs instructions for color processing.

OVERVIEW OF EXEMPLARY EMBODIMENTS

For example, photographic images of products published on electronic commerce (EC) sites are generally obtained by photographing a product illuminated by a photographic light source, which is a light source used for photography (such as a strobe or a flash). In this case, it is possible to limit shadows and the like caused by the shape of the product from appearing in the photographic image, but on the other hand, an inconsistency may occur between the color of the product in the photographic image and the color of the actual product. Accordingly, in an exemplary embodiment, an image in which color change due to a photographic light source has been moderated is generated on the basis of an image obtained while under illumination by a photographic light source, and an image obtained while not under illumination by the photographic light source.

First Exemplary Embodiment

Overview

FIGS. 2A to 4B are diagrams for explaining methods of generating pixel information of a reference pixel which is used as a reference for image adjustment according to a first exemplary embodiment.

Figure 2A:
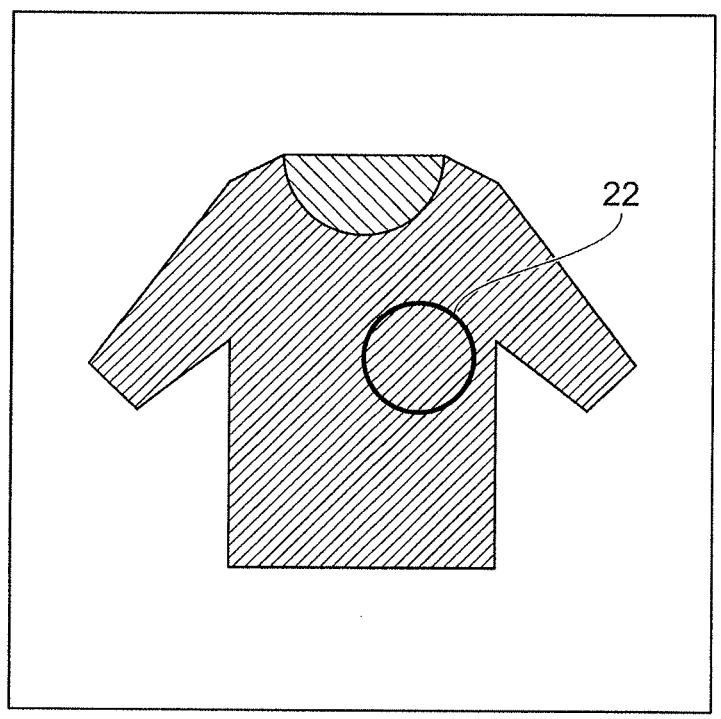
FIGS. 2A and 2B are diagrams for explaining a method of generating pixel information of a reference pixel in response to a user operation according to a first exemplary embodiment.
Figure 2B:
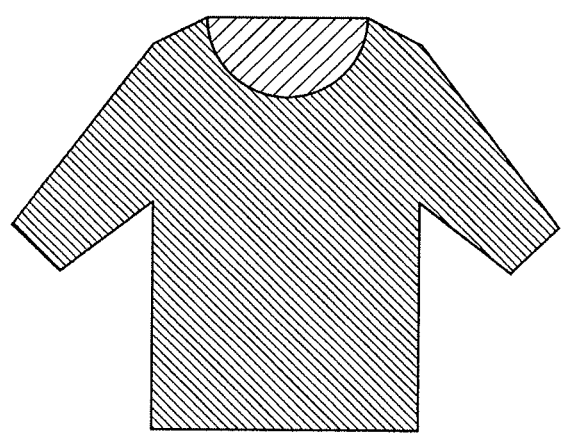

First, FIG. 2A illustrates a display example of the display screen 21 when the user selects a reference pixel. Herein, a photographic image depicting a product or the like illuminated by a photographic light source (hereinafter called a "photographic light source image") is displayed on the display screen 21. Meanwhile, FIG. 2B illustrates the actual product or the like that acts as the basis for the photographic light source image illustrated in FIG. 2A. The user refers to the actual colors in FIG. 2B, and uses the input device 30 such as a mouse to select a region in which the color appears different in the photographic light source image of FIG. 2A. In the drawings, a region 22 is selected. Subsequently, the color processing device 10 identifies the position and range of the region selected by the user, and recognizes the average of the pixel values (RGB values) included in the region as the pixel information of a reference pixel in the photographic light source image.

Figure 3:
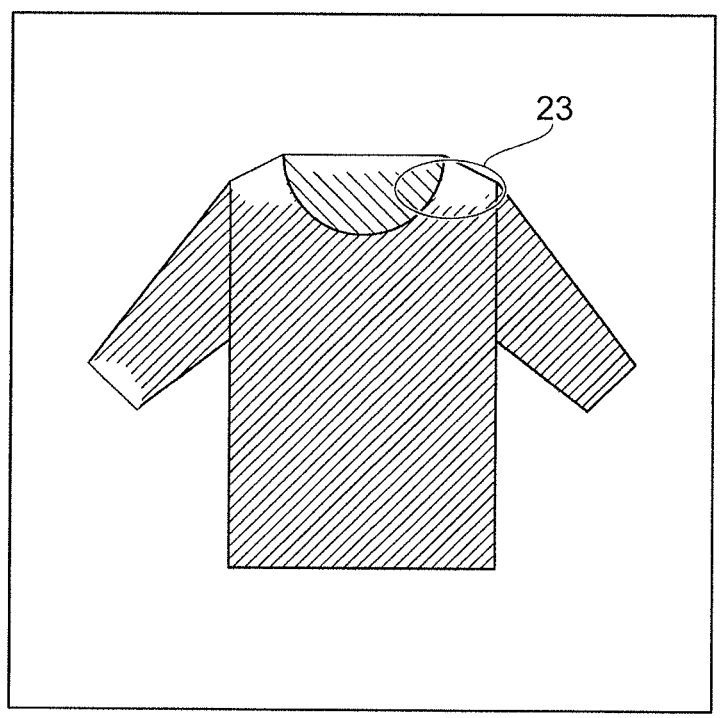
FIG. 3 is a diagram for explaining a first method of generating pixel information of a reference pixel by image analysis according to a first exemplary embodiment.

In addition, FIG. 3 illustrates a first example of the color processing device 10 selecting a reference pixel by analyzing an image. Herein, the color processing device 10 analyzes the photographic light source image, and subsequently selects a bright pixel in the photographic light source image. In FIG. 3, suppose that one pixel inside a portion 23 has been selected. Subsequently, the color processing device 10 recognizes the pixel information of the pixel selected inside the portion 23 as the pixel information of a reference pixel in the photographic light source image. The first example is illustrated because, for a bright pixel, the brightness difference between the state of being illuminated by the photographic light source and the state of not being illuminated by the photographic light source tends to be small, and thus if the entire image is adjusted using such a bright pixel as the reference pixel, the likelihood of producing tone jumps is reduced.

Figure 4A:
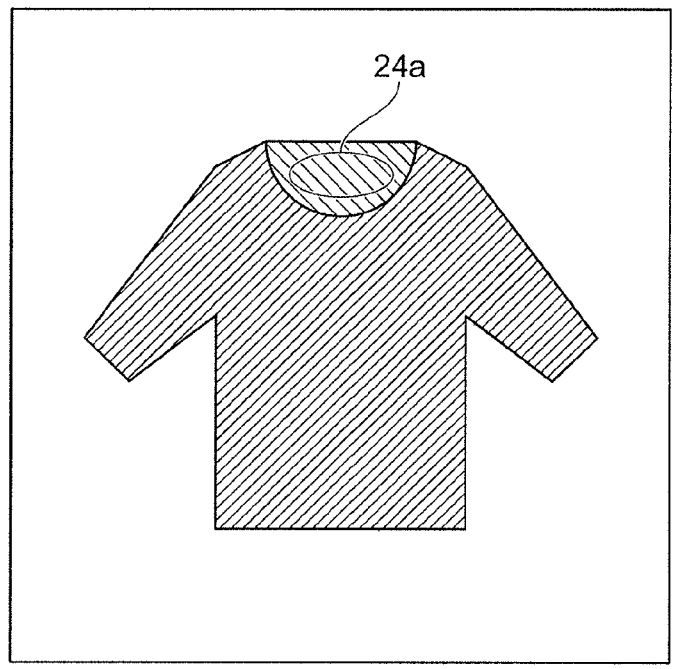
FIGS. 4A and 4B are diagrams for explaining a second method of generating pixel information of a reference pixel by image analysis according to a first exemplary embodiment.
Figure 4B:
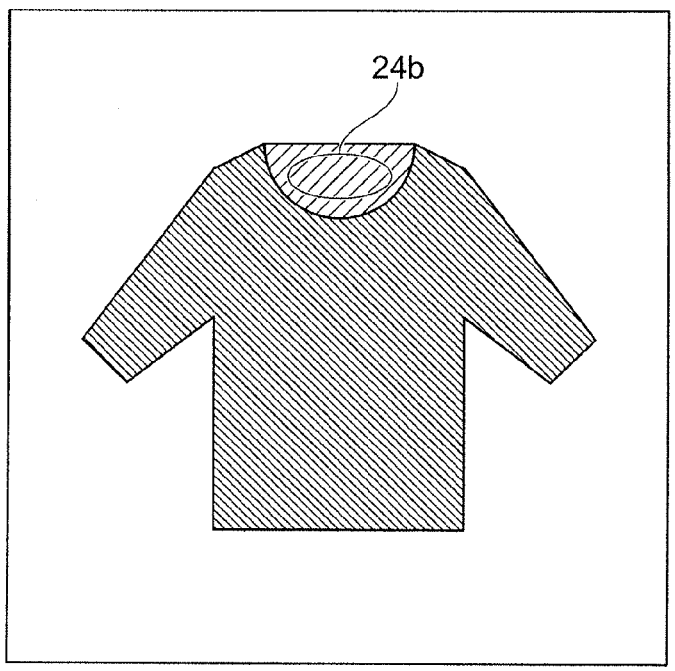

Furthermore, FIGS. 4A and 4B illustrate a second example of the color processing device 10 selecting a reference pixel by analyzing an image. Herein, the color processing device 10 analyzes a photographic light source image, and a photographic image depicting a product or the like not illuminated by a photographic light source, or in other words, under illumination by an observational light source (hereinafter called an "observational light source image"). Subsequently, the color processing device 10 selects a pixel for which the brightness difference between the photographic light source image and the observational light source image is minimized. In FIGS. 4A and 4B, suppose that one pixel inside a portion 24a and one corresponding pixel inside a portion 24b have been selected. Subsequently, the color processing device 10 recognizes the pixel information of the pixel selected inside the portion 24a as the pixel information of a reference pixel in the photographic light source image, and also recognizes the pixel information of the pixel selected inside the portion 24b as the pixel information of a reference pixel in the observational light source image. The second example is illustrated because if the entire image is adjusted using, as the reference pixel, a pixel for which the brightness difference between the state of being illuminated by the photographic light source and the state of not being illuminated by the photographic light source is small, the likelihood of producing tone jumps is reduced.

Figure 5:
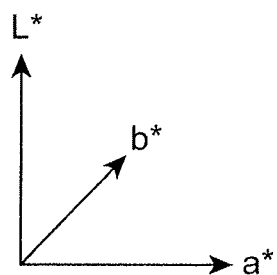
FIG. 5 is a diagram for explaining a method of adjusting pixel information of a reference pixel according to a first exemplary embodiment.
Figure 5:
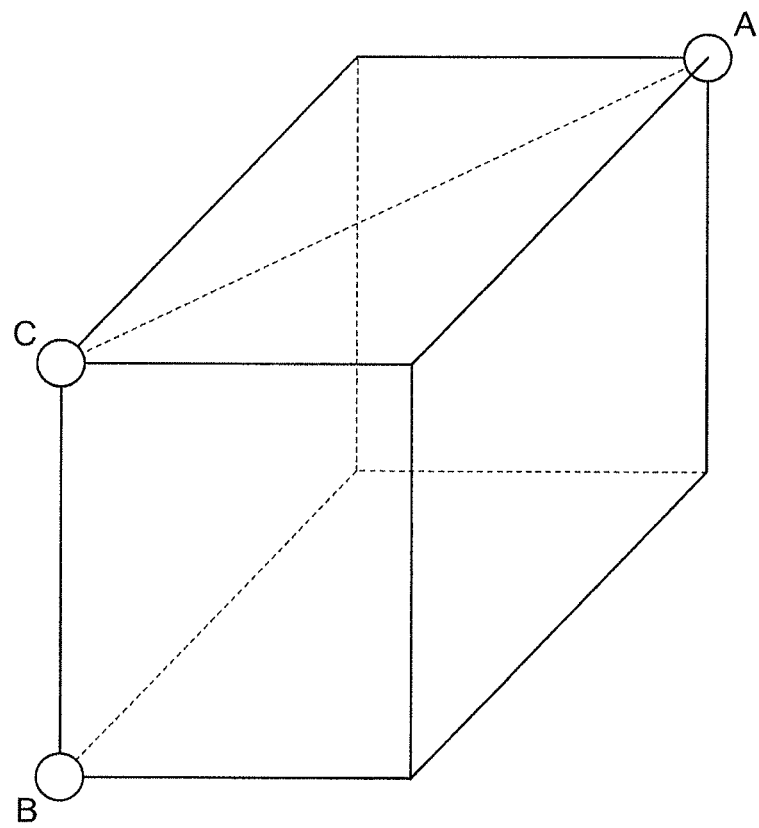

FIG. 5 is a diagram for explaining a method of adjusting pixel information of a reference pixel according to the first exemplary embodiment. Note that although a method of adjusting pixel information in a Lab color space is illustrated herein as an example, a method of adjusting in another color space, such as the RGB color space, is also acceptable.

In FIG. 5, the point A represents the pixel information of the reference pixel in the photographic light source image (hereinafter called the "photographic light source pixel information"), the point B represents the pixel information of the reference pixel in the observational light source image (hereinafter called the "observational light source pixel information"), and the point C represents the pixel information of the reference pixel in the image after adjustment (adjusted image) (hereinafter called the "adjusted pixel information"). Note that since a Lab color space is given as an example herein, each set of pixel information is a set of Lab values.

In this state, the color processing device 10 generates the adjusted pixel information by treating the L-value of the photographic light source pixel information as the L-value of the adjusted pixel information, and by treating the a- and b-values of the observational light source pixel information as the a- and b-values of the adjusted pixel information. However, this is merely one example. The adjusted pixel information may also be generated by treating any L-value from the L-value of the photographic light source pixel information to the L-value of the observational light source pixel information which is closer to the L-value of the photographic light source pixel information than the L-value of the observational light source pixel information as the L-value of the adjusted pixel information, treating any a-value from the a-value of the photographic light source pixel information to the a-value of the observational light source pixel information which is closer to the a-value of the observational light source pixel information than the a-value of the photographic light source pixel information as the a-value of the adjusted pixel information, and treating any b-value from the b-value of the photographic light source pixel information to the b-value of the observational light source pixel information which is closer to the b-value of the observational light source pixel information than the b-value of the photographic light source pixel information as the b-value of the adjusted pixel information. Alternatively, the adjusted pixel information may also be generated by not restricting the range of the L-value, a-value, and b-value of the adjusted pixel information, and treating an L-value which is closer to the L-value of the photographic light source pixel information than the L-value of the observational light source pixel information as the L-value of the adjusted pixel information, treating an a-value which is closer to the a-value of the observational light source pixel information than the a-value of the photographic light source pixel information as the a-value of the adjusted pixel information, and treating a b-value which is closer to the b-value of the observational light source pixel information than the b-value of the photographic light source pixel information as the b-value of the adjusted pixel information.

Figure 6:
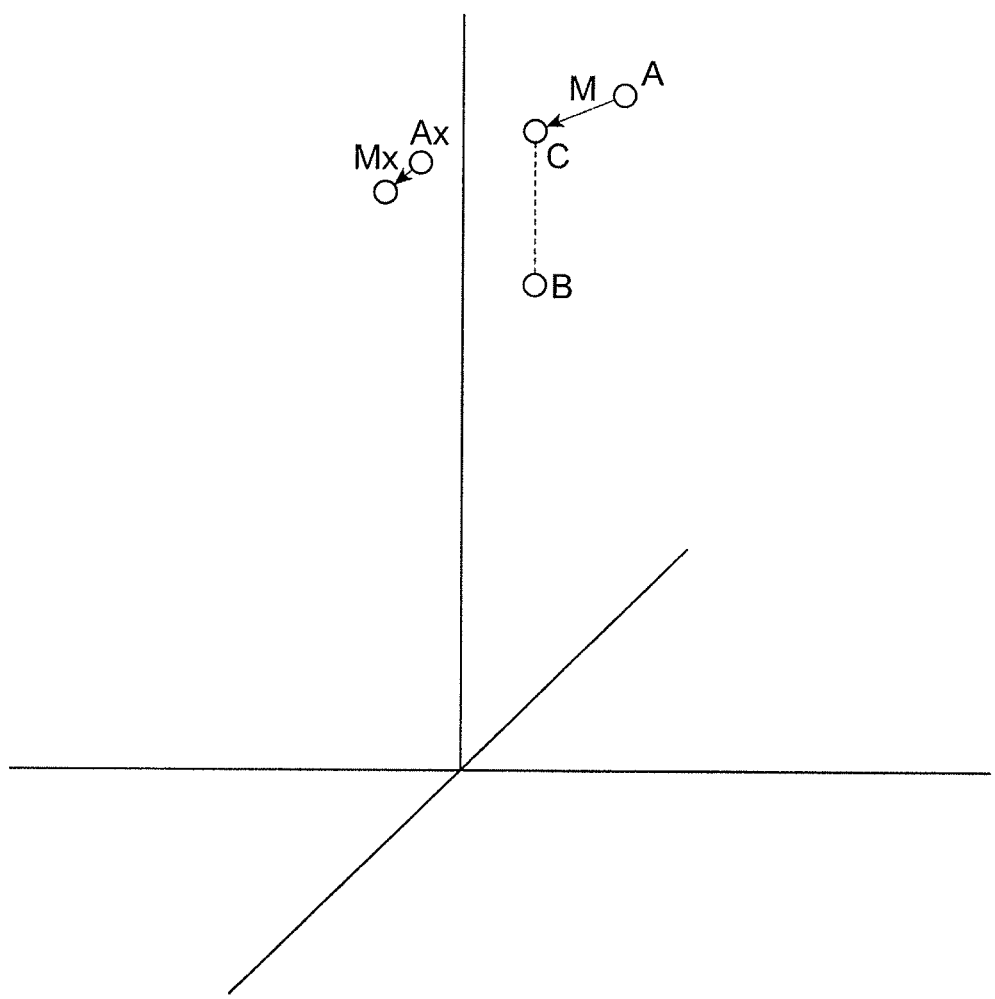
FIG. 6 is a diagram for explaining a method of controlling a correction magnitude for pixel information according to a first exemplary embodiment.

FIG. 6 is a diagram for explaining a method of controlling a correction magnitude for pixel information according to the first exemplary embodiment. Note that although a method of controlling the correction magnitude in a Lab color space is illustrated herein as an example, a method of controlling the correction magnitude in another color space, such as the RGB color space, is also acceptable.

In FIG. 6, the point A represents the pixel information of the reference pixel in the photographic light source image (photographic light source pixel information), the point B represents the pixel information of the reference pixel in the observational light source image (observational light source pixel information), and the point C represents the pixel information of the reference pixel in the adjusted image (adjusted pixel information). Additionally, the point Ax represents the pixel information of a pixel other than the reference pixel in the photographic light source image. Note that since a Lab color space is given as an example herein, each set of pixel information is a set of Lab values.

In this state, the color processing device 10 treats a correction magnitude M for point A as being the difference between the Lab values represented by point A and the Lab values represented by point C. Additionally, a correction magnitude Mx for point Ax is treated as being the value obtained by decreasing the correction magnitude M according to the distance between point A and point Ax. In this case, the correction magnitude Mx may be treated as value obtained by decreasing the correction magnitude M with some kind of function that depends on the distance between point A and point Ax, such as a value obtained by decreasing the correction magnitude M with the following sigmoid function, for example.

$$Mx = M \times \left(1 - \frac{1}{1 + e^{-(Dt-\alpha)}}\right) \qquad \text{[Math. 1]}$$

Herein, Dt is a variable expressing the distance between point A and point Ax, while α is a compensation coefficient. The compensation coefficient may be configured arbitrarily by the user.

Figure 7:
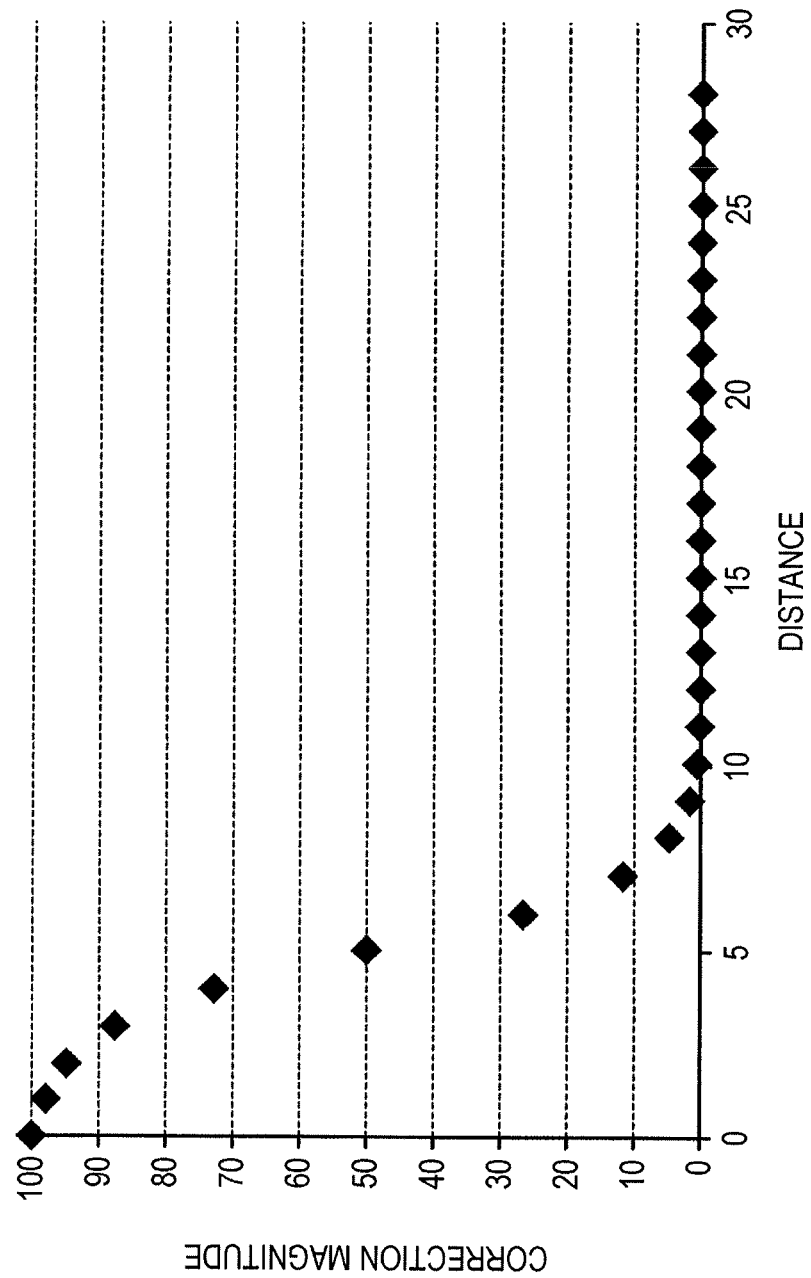
FIG. 7 is a graph illustrating a relationship between the distance of the pixel information of a certain pixel from the pixel information of a reference pixel, and the correction magnitude for the pixel information of the pixel, which is used in a first exemplary embodiment.

FIG. 7 is a graph illustrating the relationship between the distance of point Ax from point A, and the correction magnitude for point Ax. The graph treats the correction magnitude for point A as 100, and illustrates how the correction magnitude changes according to the distance from point A.

In this way, the color processing device 10 controls the correction magnitude for pixel information other than the photographic light source pixel information, so that the correction magnitude decreases as the distance of that pixel information from the photographic light source pixel information increases. Consequently, the color processing device 10 corrects only the specific region in which the color is shifted.

(Configuration of Color Processing Device)

Figure 8:
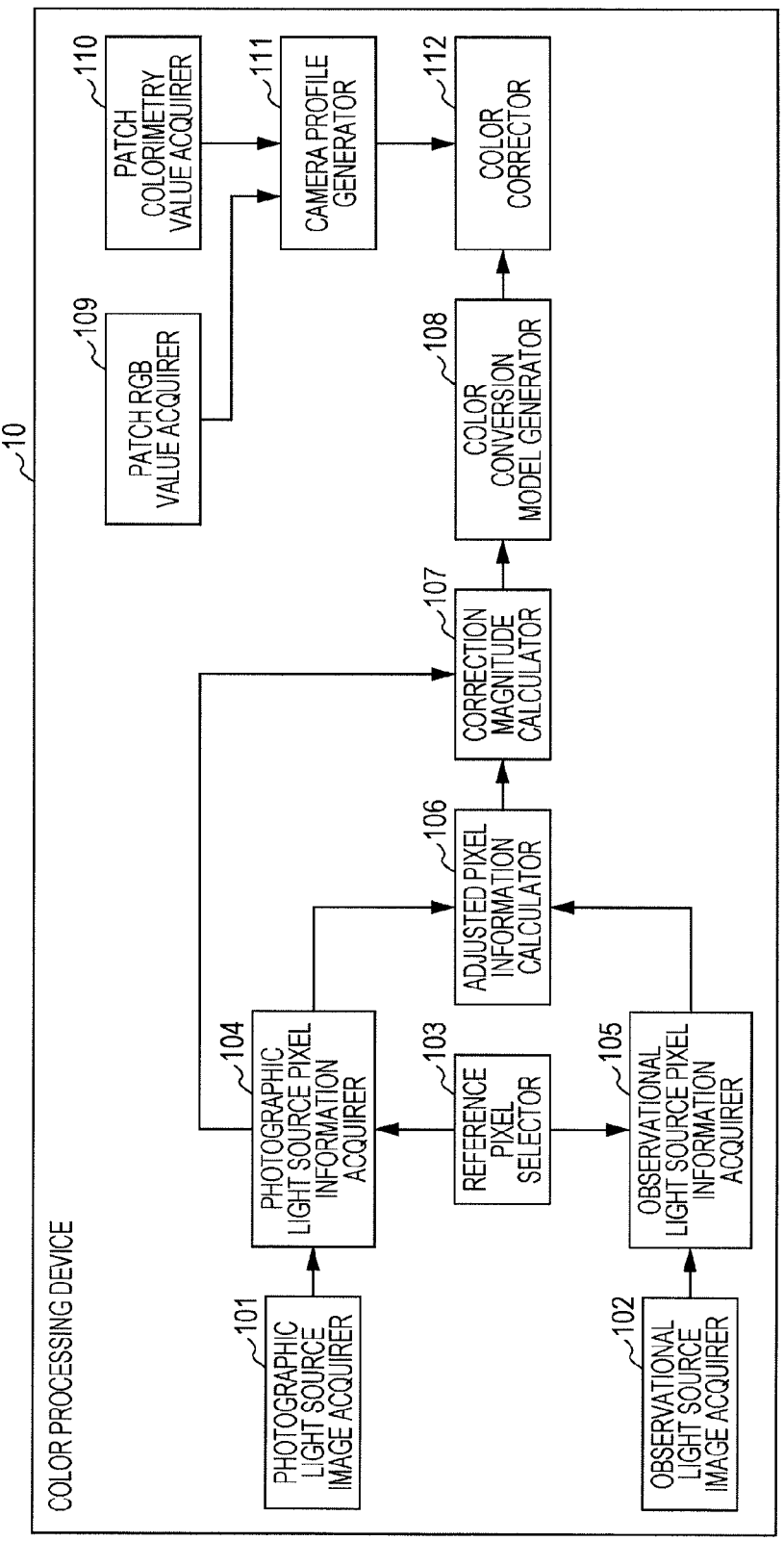
FIG. 8 is a block diagram illustrating an exemplary configuration of a color processing device according to a first exemplary embodiment.

FIG. 8 is a block diagram illustrating an exemplary configuration of the color processing device 10 according to the first exemplary embodiment. As illustrated in FIG. 8, the color processing device 10 is equipped with a photographic light source image acquirer 101, an observational light source image acquirer 102, a reference pixel selector 103, a photographic light source pixel information acquirer 104, an observational light source pixel information acquirer 105, an adjusted pixel information calculator 106, a correction magnitude calculator 107, and a color conversion model generator 108. Additionally, the color processing device 10 is equipped with a patch RGB value acquirer 109, a patch colorimetry value acquirer 110, a camera profile generator 111, and a color corrector 112.

The photographic light source image acquirer 101 acquires a photographic light source image obtained by using a camera to photograph a product or the like illuminated by a photographic light source. Note that the pixel information of each pixel in the photographic light source image is taken to be RGB values. In the present exemplary embodiment, the photographic light source image is used as an example of a first image obtained by photographing a subject illuminated by a photographic light source.

The observational light source image acquirer 102 acquires an observational light source image obtained by using a camera to photograph a product or the like not illuminated by the photographic light source, or in other words, under illumination by an observational light source. Note that the pixel information of each pixel in the observational light source image is taken to be RGB values. In the present exemplary embodiment, the observational light source image is used as an example of a second image obtained by photographing a subject not illuminated by a photographic light source.

The reference pixel selector 103 selects a reference pixel which is used as a reference for image adjustment. Herein, the method of selecting the reference pixel may be a first method in which the photographic light source image is displayed on the display device 20 (see FIG. 1), and the user selects a pixel by performing an operation of specifying the pixel on the photographic light source image. In a modification of the first method, the user selects a region by performing an operation of specifying the region on the photographic light source image, as illustrated in FIG. 2A. Another method is a second method of analyzing the photographic light source image and selecting a bright pixel, as illustrated in FIG. 3. Note that in the second method, a pixel in the photographic light source image may be selected as the reference pixel when the brightness of that pixel satisfies a predetermined condition by which the brightness is judged to be high. Furthermore, a third method is a method of comparing the photographic light source image and the observational light source image, and selecting a pixel for which the brightness difference is small, as illustrated in FIGS. 4A and 4B. Note that in the third method, a pixel may be selected as the reference pixel when the difference between the brightness of the pixel in a first image and the brightness of a corresponding pixel in a second image satisfies a predetermined condition by which the brightness difference is judged to be small. In the present exemplary embodiment, the reference pixel is used as an example of a specific pixel.

The photographic light source pixel information acquirer 104 acquires the pixel information of the reference pixel selected by the reference pixel selector 103 from the photographic light source image acquired by the photographic light source image acquirer 101, and treats the acquired pixel information as the photographic light source pixel information. In the case of the reference pixel selector 103 selecting a region according to the above modification of the first method, the average of the pixel information of all pixels included in that region of the photographic light source image may be calculated and treated as the photographic light source pixel information. Alternatively, one set of pixel information may be calculated from among the pixel information of multiple pixels included in the region of the photographic light source image, and treated as the photographic light source pixel information. Note that although the pixel information of each pixel in the photographic light source image is taken to be RGB values, the photographic light source pixel information acquirer 104 may also convert the RGB values and treat the photographic light source pixel information as Lab values. In the present exemplary embodiment, the photographic light source pixel information is used as an example of a first color value, which is a color value of a specific pixel in the first image, and the photographic light source pixel information acquirer 104 is provided as an example of a first color value acquirer that acquires the first color value.

The observational light source pixel information acquirer 105 acquires the pixel information of the reference pixel selected by the reference pixel selector 103 from the observational light source image acquired by the observational light source image acquirer 102, and treats the acquired pixel information as the observational light source pixel information. In the case of the reference pixel selector 103 selecting a region according to the above modification of the first method, the average of the pixel information of all pixels included in that region of the observational light source image may be calculated and treated as the observational light source pixel information. Alternatively, one set of pixel information may be calculated from among the pixel information of multiple pixels included in the region of the observational light source image, and treated as the observational light source pixel information. Note that although the pixel information of each pixel in the observational light source image is taken to be RGB values, the observational light source pixel information acquirer 105 may also convert the RGB values and treat the observational light source pixel information as Lab values. In the present exemplary embodiment, the observational light source pixel information is used as an example of a second color value, which is a color value of a pixel corresponding to a specific pixel in the second image, and the observational light source pixel information acquirer 105 is provided as an example of a second color value acquirer that acquires the second color value.

The adjusted pixel information calculator 106 calculates the adjusted pixel information on the basis of the photographic light source pixel information acquired by the photographic light source pixel information acquirer 104 and the observational light source pixel information acquired by the observational light source pixel information acquirer 105. For example, as described using FIG. 5, the adjusted pixel information may be calculated by treating the L-value of the photographic light source pixel information as the L-value of the adjusted pixel information, and by treating the a- and b-values of the observational light source pixel information as the a- and b-values of the adjusted pixel information. In the present exemplary embodiment, the adjusted pixel information is used as an example of a third color value expressing a luminance closer to the luminance of the first color value than the luminance of the second color value, and a chroma closer to the chroma of the second color value than the chroma of the first color value. Also, the adjusted pixel information calculator 106 is provided as an example of a third color value acquirer that acquires the third color value.

The correction magnitude calculator 107 uses the adjusted pixel information calculated by the adjusted pixel information calculator 106 and the photographic light source pixel information acquired by the photographic light source pixel information acquirer 104 to calculate the difference therebetween, and treats the difference as the correction magnitude for the photographic light source pixel information.

The color conversion model generator 108 generates a color conversion model using the correction magnitude for the photographic light source pixel information calculated by the correction magnitude calculator 107. Herein, a color conversion model refers to a model used when generating the adjusted image on the basis of the photographic light source image and the observational light source image, and is a model defining the correction magnitude used when correcting the photographic light source image for each set of pixel information in a color space. As described using FIGS. 6 and 7, the color conversion model may define the correction for each set of pixel information in the color space to be a correction of small correction magnitude to the extent that the distance from the photographic light source pixel information is large, for example. Alternatively, the correction may be further generalized and defined to be a correction using correction content from the photographic light source pixel information to the adjusted pixel information. In the present exemplary embodiment, the adjusted image is used as an example of a third image generated on the basis of the first image and the second image. In addition, the color conversion model generator 108 is provided as an example of a setting unit that sets the color value of the pixel corresponding to the specific pixel in the third image to a third color value, and sets the color value of a pixel corresponding to an other pixel other than the specific pixel in the third image to a color value obtained by performing correction on the color of the other pixel in the first image using the content of the correction from the first color value to the third color value.

The patch RGB value acquirer 109 acquires the RGB values of multiple patches (patch RGB values) from an image obtained by a camera photographing multiple color patches (patches).

The patch colorimetry value acquirer 110 acquires colorimetry values of multiples patches (patch colorimetry values) from information obtained by a colorimeter performing colorimetry on multiple color patches (patches). Herein, suppose that XYZ values are acquired as the patch colorimetry values.

The camera profile generator 111 generates a profile for a camera (camera profile) using the multiple patch RGB values acquired by the patch RGB value acquirer 109 and the multiple patch colorimetry values acquired by the patch colorimetry value acquirer 110. Specifically, the camera profile generator 111 receives multiple patch RGB values from the patch RGB value acquirer 109, additionally receives multiple patch colorimetry values from the patch colorimetry value acquirer 110, and converts the multiple patch colorimetry values into Lab values of the multiple patches (patch Lab values). Subsequently, the camera profile generator 111 generates a camera profile by respectively associating the corresponding values between the multiple patch RGB values and the multiple patch Lab values, and performing a weighted linear regression.

The color corrector 112 uses the color conversion model generated by the color conversion model generator 108 and the camera profile generated by the camera profile generator 111 to perform color correction on the photographic light source image acquired by the photographic light source image acquirer 101. Specifically, first, the RGB values of each pixel in the photographic light source image acquired by the photographic light source image acquirer 101 are converted into corresponding Lab values using the camera profile. After that, the converted Lab values are corrected by the correction magnitude for those Lab values defined by the color conversion model.

(Operation of Color Processing Device)

Figure 9:
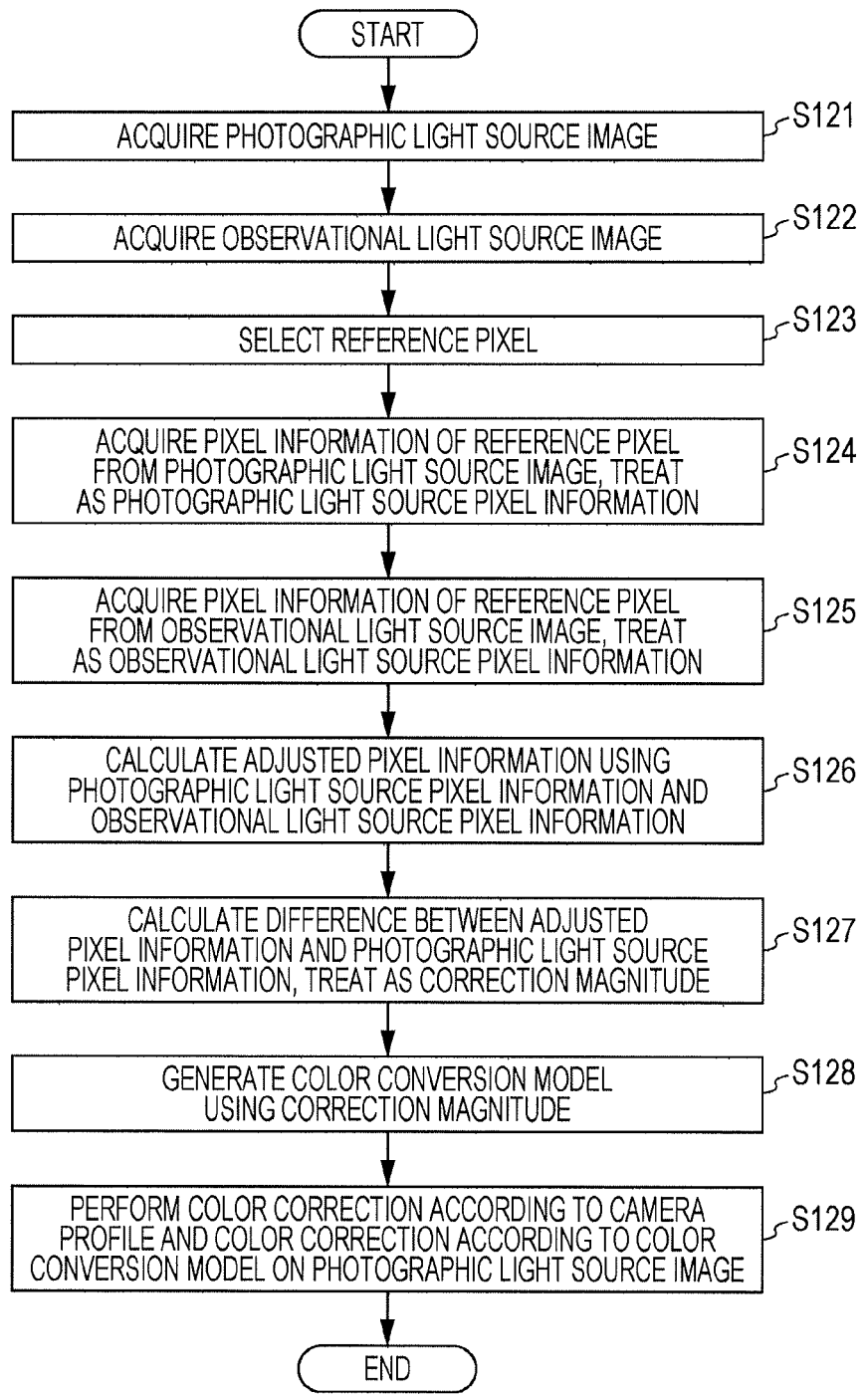
FIG. 9 is a flowchart illustrating exemplary operation of a color processing device according to a first exemplary embodiment.

FIG. 9 is a flowchart illustrating exemplary operation of the color processing device 10 according to the first exemplary embodiment. Note that this exemplary operation supposes that the camera profile generator 111 has generated a camera profile prior to the start of operation.

As illustrated in FIG. 9, in the color processing device 10, first, the photographic light source image acquirer 101 acquires a photographic light source image (step 121). Subsequently, the observational light source image acquirer 102 acquires an observational light source image (step 122).

Next, the reference pixel selector 103 selects a reference pixel (step 123). Subsequently, the photographic light source pixel information acquirer 104 acquires the pixel information of the reference pixel selected in step 123 from the pixel information of the photographic light source acquired in step 121, and treats the acquired pixel information as the photographic light source pixel information (step 124). In addition, the observational light source pixel information acquirer 105 acquires the pixel information of the reference pixel selected in step 123 from the pixel information of the observational light source acquired in step 122, and treats the acquired pixel information as the observational light source pixel information (step 125).

Next, the adjusted pixel information calculator 106 uses the photographic light source pixel information acquired in step 124 and the observational light source pixel information acquired in step 125 to calculate adjusted pixel information (step 126). Additionally, the correction magnitude calculator 107 calculates the difference between the adjusted pixel information calculated in step 126 and the photographic light source pixel information acquired in step 124, and treats the difference as the correction magnitude for the photographic light source pixel information (step 127). Furthermore, the color conversion model generator 108 uses the correction magnitude calculated in step 127 to generate a color conversion model (step 128).

After that, the color corrector 112 performs color correction on the photographic light source image acquired in step 121 according to the camera profile generated by the camera profile generator 111, and after that, performs color correction according to the color conversion model generated in step 128 (step 129).

Second Exemplary Embodiment

Overview

In the first exemplary embodiment, the pixel information of one reference pixel is generated, but in the second exemplary embodiment, the pixel information of multiple reference pixels is generated. For example, the user uses the input device 30 such as a mouse to select multiple regions in which the color appears different in the photographic light source of FIG. 2A. Subsequently, for each of the multiple regions, the color processing device 10 recognizes the average of the pixel values (RGB values) included in that region as the pixel information of a reference pixel in the photographic light source image. Additionally, the pixel information of each reference pixel is adjusted according to the method described using FIG. 5.

Figure 10:
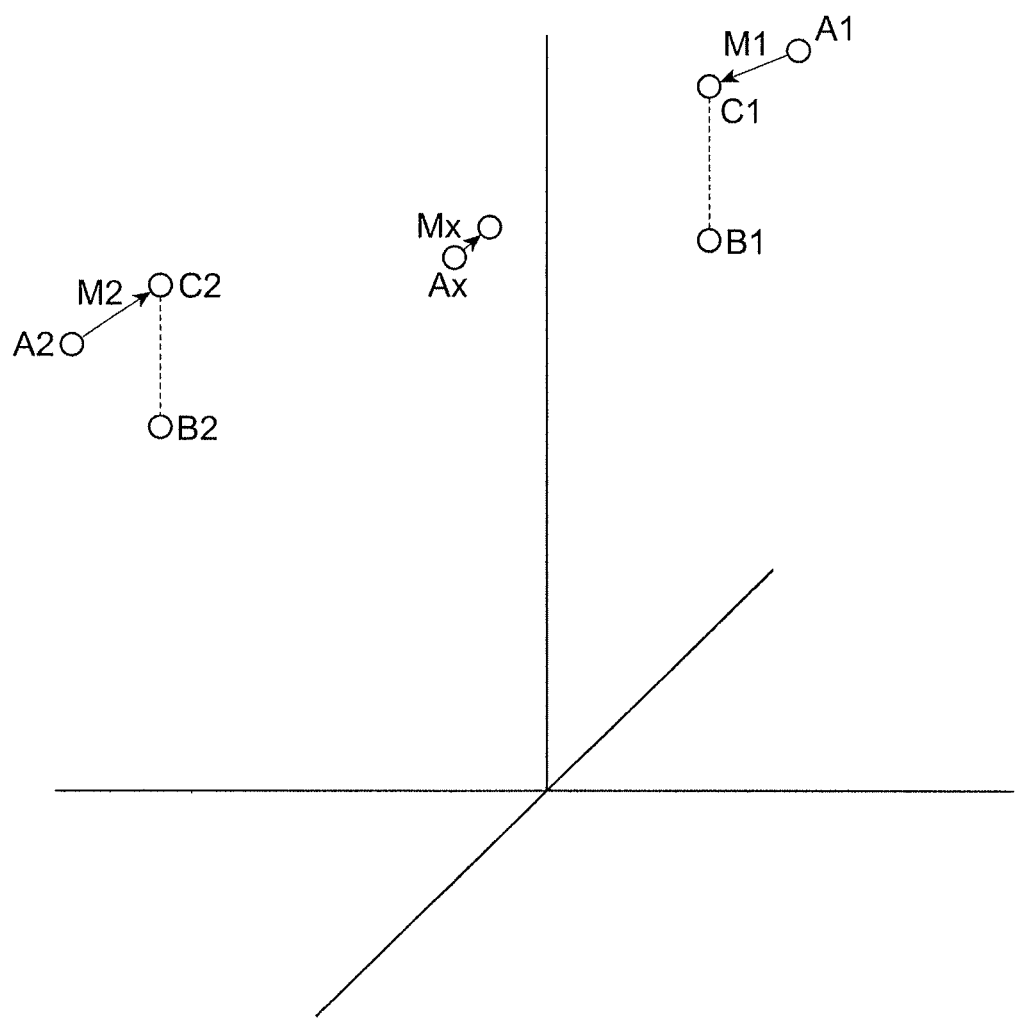
FIG. 10 is a diagram for explaining a method of controlling a correction magnitude for pixel information according to a second exemplary embodiment.

FIG. 10 is a diagram for explaining a method of controlling a correction magnitude for pixel information according to the second exemplary embodiment. FIG. 10 illustrates a case in which a first reference pixel and a second reference pixel are selected. Note that although a method of controlling the correction magnitude in a Lab color space is illustrated herein as an example, a method of controlling the correction magnitude in another color space, such as the RGB color space, is also acceptable.

In FIG. 10, the point A1 represents the pixel information of the first reference pixel in the photographic light source image (photographic light source pixel information), the point B1 represents the pixel information of the first reference pixel in the observational light source image (observational light source pixel information), and the point C1 represents the pixel information of the first reference pixel in the adjusted image (adjusted pixel information). Also, the point A2 represents the pixel information of the second reference pixel in the photographic light source image (photographic light source pixel information), the point B2 represents the pixel information of the second reference pixel in the observational light source image (observational light source pixel information), and the point C2 represents the pixel information of the second reference pixel in the adjusted image (adjusted pixel information). Furthermore, the point Ax represents the pixel information of a pixel other than the reference pixel in the photographic light source image. Note that since a Lab color space is given as an example herein, each set of pixel information is a set of Lab values.

In this state, the color processing device 10 treats a correction magnitude M1 for point A1 as being the difference between the Lab values represented by point A1 and the Lab values represented by point C1, and treats a correction magnitude M2 for point A2 as being the difference between the Lab values represented by point A2 and the Lab values represented by point C2. Additionally, a correction magnitude Mx for point Ax is treated as being the value obtained by decreasing the correction magnitude M1 according to the distance between point A1 and point Ax, and the value obtained by decreasing the correction magnitude M2 according to the distance between point A2 and point Ax.

Figure 11:
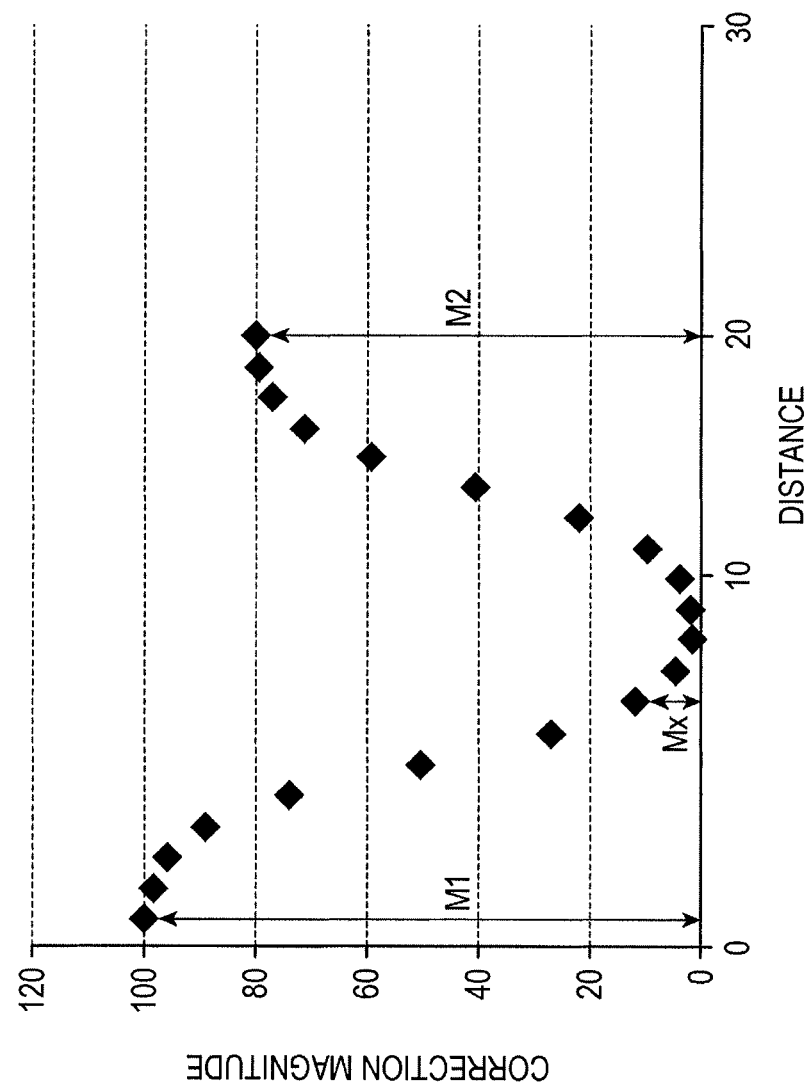
FIG. 11 is a graph illustrating a relationship between the distance of the pixel information of a certain pixel from the pixel information of a reference pixel, and the correction magnitude for the pixel information of the pixel, which is used in a second exemplary embodiment.

FIG. 11 is a graph illustrating the relationship between the distance of point Ax from point A1, and the correction magnitude for point Ax. The graph treats the correction magnitude for point A1 as 100, and illustrates how the correction magnitude changes according to the distance from point A1.

In this way, when multiple reference pixels are selected, the color processing device 10 controls the correction magnitude so that the correction magnitude becomes smaller for pixel information closer to the median point of the pixel information of the multiple reference pixels. For example, when two reference pixels are selected, the correction magnitude becomes smaller for pixel information closer to the midpoint of the pixel information of the two reference pixels.

(Configuration and Operation of Color Processing Device)

The configuration of the color processing device 10 according to the second exemplary embodiment is the same as the configuration of the color processing device 10 according to the first exemplary embodiment illustrated in FIG. 8. However, since the processing content of each structural element differs from the first exemplary embodiment in some cases, these differences will be described. Namely, the reference pixel selector 103 selects N reference pixels (where N≥2), and correspondingly, the photographic light source pixel information acquirer 104 acquires N sets of photographic light source pixel information, the observational light source pixel information acquirer 105 acquires N sets of observational light source pixel information, the adjusted pixel information calculator 106 calculates N sets of adjusted pixel information, and the correction magnitude calculator 107 calculates N correction magnitudes. Additionally, the color conversion model generator 108 generates a color conversion model using the N correction magnitudes.

The operation of the color processing device 10 according to the second exemplary embodiment is likewise the same as the operation of the color processing device 10 according to the first exemplary embodiment illustrated in FIG. 9. However, since the processing content of each step differs from the first exemplary embodiment in some cases, these differences will be described. Namely, N reference pixels (where N≥2) are selected in step 123, and correspondingly, N sets of photographic light source pixel information are acquired in step S124, N sets of observational light source pixel information are acquired in step 125, N sets of adjusted pixel information are calculated in step 126, and N correction magnitudes are calculated in step 127. Additionally, in step 128, a color conversion model is generated using the N correction magnitudes calculated in step 127.

Exemplary Modifications

In the foregoing exemplary embodiments, the photographic light source image acquirer 101 and the observational light source image acquirer 102 acquire Lab values as pixel information, and the adjusted pixel information calculator 106, the correction magnitude calculator 107, and the color conversion model generator 108 perform processing in the Lab color space, but the configuration is not limited thereto. The photographic light source image acquirer 101 and the observational light source image acquirer 102 may also acquire RGB values as pixel information, and the adjusted pixel information calculator 106, the correction magnitude calculator 107, and the color conversion model generator 108 may also perform processing in the RGB color space. In this case, the adjusted pixel information calculator 106 may use the luminance of the RGB values instead of the L-value, and use the chroma of the RGB values instead of the a-value and the b-value. Additionally, in this case, the color corrector 112 may first correct the RGB values of each pixel of the photographic light source image acquired by the photographic light source image acquirer 101 by the correction magnitude for those RGB values defined by the color conversion model, and after that, convert the corrected RGB values to corresponding Lab values using the camera profile.

Additionally, in the foregoing exemplary embodiments, as a presupposition to correcting the photographic light source image acquired by the photographic light source image acquirer 101, the correction magnitude calculator 107 calculates the correction magnitude from the photographic light source pixel information to the adjusted pixel information, and the color conversion model generator 108 generates a color conversion model related to correction from the photographic light source pixel information to the adjusted pixel information, but the configuration is not limited thereto. As a presupposition to correcting the observational light source image acquired by the observational light source image acquirer 102, the correction magnitude calculator 107 may also calculate the correction magnitude from the observational light source pixel information to the adjusted pixel information, and the color conversion model generator 108 may also generate a color conversion model related to correction from the observational light source pixel information to the adjusted pixel information. Note that in this case, the color conversion model generator 108 becomes an example of a setting unit that sets the color value of the pixel corresponding to the specific pixel in the third image to a third color value, and sets the color value of a pixel corresponding to an other pixel other than the specific pixel in the third image to a color value obtained by performing correction on the color of the pixel corresponding to the other pixel in the second image using the content of the correction from the second color value to the third color value.

[Hardware Configuration of Color Processing Device]

Figure 12:
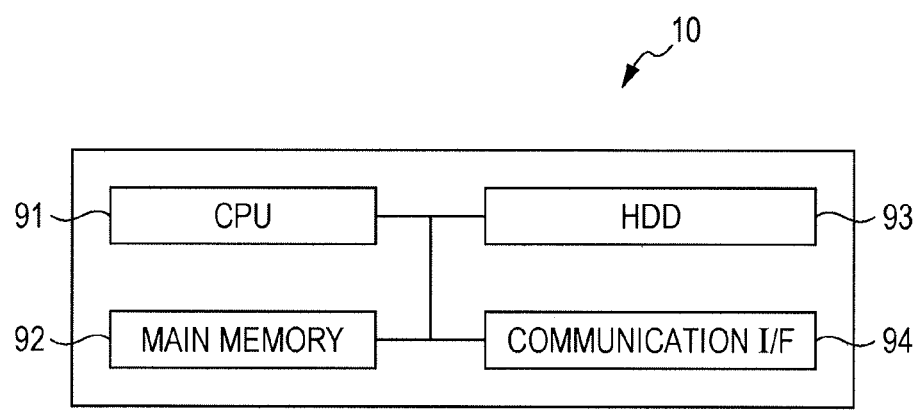
FIG. 12 is a diagram illustrating an exemplary hardware configuration of a color processing device according to an exemplary embodiment of the present invention.

FIG. 12 is a diagram illustrating an exemplary hardware configuration of the color processing device 10. The color processing device 10 is realized by a personal computer or the like as discussed earlier. Furthermore, as illustrated in FIG. 12, the color processing device 10 is equipped with a central processing unit (CPU) 91 as a computational component, as well as main memory 92 and a hard disk drive (HDD) 93 as storage components. Herein, the CPU 91 executes various programs, such as an operating system (OS) and application software. Also, the main memory 92 stores information such as various programs and data used in the execution thereof, while the HDD 93 stores information such as input data that is input into various programs and output data that is output from various programs. Furthermore, the color processing device 10 is equipped with a communication interface (hereinafter designated the "communication I/F") 94 for communicating with external apparatus.

[Program]

The process performed the color processing device 10 according to an exemplary embodiment discussed in the foregoing is prepared as a program, such as application software, for example.

Consequently, the process performed by the color processing device 10 according to an exemplary embodiment may also be interpreted as being a program causing a computer to execute: a function of acquiring a first color value, which is a color value of a specific pixel in a first image obtained by photographing a subject illuminated by a photographic light source, which is a light source used for photography; a function of acquiring a second color value, which is a color value of a pixel corresponding to the specific pixel in a second image obtained by photographing the subject not illuminated by the photographic light source; a function of acquiring a third color value expressing a luminance closer to the luminance of the first color value than the luminance of the second color value, and a chroma closer to the chroma of the second color value than the chroma of the first color value; and, for a third image generated on the basis of the first image and the second image, a function of setting the color value of a pixel corresponding to the specific pixel in the third image to the third color value, and setting the color value of a pixel corresponding to an other pixel other than the specific pixel in the third image to a color value obtained by performing correction on the color value of the other pixel in the first image or the color value of the pixel corresponding to the other pixel in the second image using content of the correction from the first color value to the third color value or content of the correction from the second color value to the third color value.

Note that a program realizing an exemplary embodiment obviously may be provided via a communication medium, and may also be provided by being stored on a recording medium such as CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
    a first color value acquirer that acquires a first color value, which is a color value of a specific pixel in a first image obtained by photographing a subject illuminated by a photographic light source, which is a light source used for photography;
    a second color value acquirer that acquires a second color value, which is a color value of a pixel corresponding to the specific pixel in a second image obtained by photographing the subject not illuminated by the photographic light source;
    a third color value acquirer that acquires a third color value expressing a luminance closer to the luminance of the first color value than the luminance of the second color value, and a chroma closer to the chroma of the second color value than the chroma of the first color value; and
    a setting unit that, for a third image generated on a basis of the first image and the second image, sets the color value of a pixel corresponding to the specific pixel in the third image to the third color value.

2. The image processing device according to claim 1, wherein
    the first color value acquirer, in response to a designation of a region on the first image, acquires a color value calculated from the color values of a plurality of pixels included in the region as the first color value.

3. The image processing device according to claim 1, wherein
    if a brightness of the specific pixel in the first image satisfies a predetermined condition by which the brightness is judged to be high, the first color value acquirer acquires the color value of the specific pixel as the first color value.

4. The image processing device according to claim 1, wherein
    if a difference between the brightness of the specific pixel in the first image and the brightness of the pixel corresponding to the specific pixel in the second image satisfies a predetermined condition by which the brightness difference is judged to be small, the first color value acquirer acquires the color value of the specific pixel as the first color value.

5. The image processing device according to claim 1, wherein
    the first color value, the second color value, and the third color value are Lab values, and
    the third color value acquirer acquires the third color value indicating a luminance expressed by any L-value from the L-value of the first color value to the L-value of the second color value, and a chroma expressed by any a-value from the a-value of the first color value to the a-value of the second color value and any b-value from the b-value of the first color value to the b-value of the second color value.

6. The image processing device according to claim 1, wherein
    the third color value acquirer acquires the third color value indicating the luminance of the first color value and the chroma of the second color value.

7. The image processing device according to claim 1, wherein
    the setting unit sets the color value of a pixel corresponding to an other pixel other than the specific pixel in the third image to a color value obtained by performing correction on the color value of the other pixel in the first image or the color value of the pixel corresponding to the other pixel in the second image using content of the correction from the first color value to the third color value or content of the correction from the second color value to the third color value.

8. The image processing device according to claim 1, wherein
    the setting unit sets the color value of a pixel corresponding to the other pixel in the third image to a color value obtained by performing correction on the color value of the other pixel in the first image using a correction magnitude obtained by decreasing the correction magnitude from the first color value to the third value to the extent that a distance from the first color value to the color value of the other pixel in the first image is long.

9. The image processing device according to claim 1, wherein
- the first color value acquirer acquires a plurality of first color values, which are color values of a plurality of specific pixels in the first image,
- the second color value acquirer acquires a plurality of second color values, which are color values of a plurality of pixels corresponding to the plurality of specific pixels in the second image,
- the third color value acquirer acquires a plurality of third color values for each first color value of the plurality of first color values and each second color value corresponding to each first color value of the plurality of second color values, in which each third color value corresponding to each first color value of the plurality of third color values indicates a luminance closer to the luminance of each first color value than the luminance of each second color value, and a chroma closer to the chroma of each second color value than the chroma of each first color value, and
- the setting unit sets the color values of a plurality of pixels corresponding to the plurality of specific pixels in the third image to the plurality of third color values, and sets the color value of a pixel corresponding to the other pixel in the third to a color value obtained by performing correction on the color value of the other pixel in the first image using a correction magnitude obtained by decreasing the correction magnitude from each first color value of the plurality of first color values to each third color value corresponding to each first color value of the plurality of third color values to the extent that a distance from a median point of the plurality of first color values to the color value of the other pixel in the first image is short.

10. An image processing method comprising:
acquiring a first color value, which is a color value of a specific pixel in a first image obtained by photographing a subject illuminated by a photographic light source, which is a light source used for photography;
acquiring a second color value, which is a color value of a pixel corresponding to the specific pixel in a second image obtained by photographing the subject not illuminated by the photographic light source;
acquiring a third color value expressing a luminance closer to the luminance of the first color value than the luminance of the second color value, and a chroma closer to the chroma of the second color value than the chroma of the first color value; and
setting, for a third image generated on a basis of the first image and the second image, the color value of a pixel corresponding to the specific pixel in the third image to the third color value.

11. A non-transitory computer readable medium storing a program causing a computer to execute a process for processing an image, the process comprising:
acquiring a first color value, which is a color value of a specific pixel in a first image obtained by photographing a subject illuminated by a photographic light source, which is a light source used for photography;
acquiring a second color value, which is a color value of a pixel corresponding to the specific pixel in a second image obtained by photographing the subject not illuminated by the photographic light source;
acquiring a third color value expressing a luminance closer to the luminance of the first color value than the luminance of the second color value, and a chroma closer to the chroma of the second color value than the chroma of the first color value; and
setting, for a third image generated on a basis of the first image and the second image, the color value of a pixel corresponding to the specific pixel in the third image to the third color value.

* * * * *